United States Patent
Yuyama (10) Patent No.: US 7,761,001 B2
(45) Date of Patent: Jul. 20, 2010

(54) IMAGING DEVICE WITH AUTOMATIC CONTROL FUNCTION OF LIGHT FOR SHOOTING

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 776 days.

(21) Appl. No.: 11/704,841

(22) Filed: Feb. 9, 2007

(65) Prior Publication Data
US 2007/0201854 A1 Aug. 30, 2007

(30) Foreign Application Priority Data
Feb. 27, 2006 (JP) ............................. 2006-050401

(51) Int. Cl.
*G03B 15/03* (2006.01)
(52) U.S. Cl. ...................................... 396/165
(58) Field of Classification Search ................. 396/165; 348/370, 371
See application file for complete search history.

(56) References Cited

U.S. PATENT DOCUMENTS

| | | | |
|---|---|---|---|
| 7,064,788 B2 * | 6/2006 | Yoshida et al. | 348/296 |
| 2005/0190287 A1 * | 9/2005 | Ogawa | 348/370 |

FOREIGN PATENT DOCUMENTS

| | | |
|---|---|---|
| JP | 2-239780 A | 9/1990 |
| JP | 3-203472 A | 9/1991 |
| JP | 4-176273 A | 6/1992 |
| JP | 06-014227 A | 1/1994 |
| JP | 9-134488 A | 5/1997 |
| JP | 2000-056209 A | 2/2000 |
| JP | 2000-306684 A | 11/2000 |
| JP | 2004-172978 A | 6/2004 |
| JP | 2004-191489 A | 7/2004 |

OTHER PUBLICATIONS

Japanese Office Action dated May 18, 2009 and English translation thereof issued in a counterpart Japanese Application No. 2006-050401.

* cited by examiner

*Primary Examiner*—W. B. Perkey
(74) *Attorney, Agent, or Firm*—Frishauf, Holtz, Goodman & Chick, P.C.

(57) ABSTRACT

When an auxiliary emission auto focus has been set by operation and through image display is started, a CPU 9 starts an operation of acquiring a single frame among those sequentially picked up at a predetermined interval. Next, the CPU 9 calculates an EV value, judges whether a LED 16 state. If the LED 16 is in the ON state, the CPU 9 judges the calculated EV value. If the EV value is equal to or more than EV5, the CPU 9 images a single frame after temporarily turning OFF the LED 16, and then turns the LED 16 ON to judge whether the shooting scene is really dark. Next, the CPU 9 calculates the EV value. When judged that the EV value is not equal to or less than EV3, the CPU 9 judges that the shooting scene is not dark and turns OFF the LED 16.

17 Claims, 5 Drawing Sheets

FIG. 3B 
SUB signal

FIG. 3C 
SG signal

FIG. 3D 
LED (1)

OR

FIG. 3E 
LED (2)

IMAGING DEVICE WITH AUTOMATIC CONTROL FUNCTION OF LIGHT FOR SHOOTING

CROSS-REFERENCE TO RELATED APPLICATION

This application is based upon and claims the benefit of priority from the prior Japanese Patent Application No. 2006-050401, filed 27 Feb. 2006, the entire contents of which is incorporated herein by reference.

BACKGROUND OF THE INVENTION

1. Field of the Invention

The present invention relates to an imaging device, a method of controlling a light for shooting and a computer program product for a processing program thereof. More particularly, the present invention relates to an imaging device, a method of controlling a light for shooting and a computer program product for a processing program thereof mounted with a video light.

2. Description of the Related Art

Conventionally, in an imaging device, for example, in a digital camera, there is a technology for turning ON a video light in dark shooting conditions and automatically turning it OFF in bright shooting conditions. In this field of technology, a technology has been developed for preventing the hunting phenomena in which the turning ON/OFF operations are quickly repeated by providing hysteresis (Japanese Laid-Open (Kokai) Patent Publication No. Heisei 06-14227).

However, even when hysteresis is provided for the turning ON/OFF operations, there is a problem as follows:

Even if a video light is turned ON in dark shooting conditions, the reflected light of the video light (light of video light which hits a subject and is bounced back) is incident to the image pickup element (e.g., CCD). As a result, there is a risk of repeating useless operations as follows: if the reflectance of the subject is high, the CPU misconstrues the shooting as bright because of the reflected light and accordingly turns OFF the video light. Next, when the video light is turned OFF, the CPU judges that the shooting condition is dark and turns ON the video light again.

Accordingly, the present invention has been made in view of the above-described conventional problem, and the object of the present invention is to provide an imaging device, a method of controlling a light for shooting and a computer program product for a processing program thereof capable of automatically turning ON and OFF the video light appropriately depending on the shooting conditions.

SUMMARY OF THE INVENTION

In accordance with an aspect of the present invention, there is provided an imaging device including: imaging means for imaging a subject; acquisition means for acquiring brightness information of the subject; light for shooting for emitting light; ON/OFF control means for controlling ON/OFF of the light for shooting based on the brightness information acquired by the acquisition means; detection means for detecting a timing at which the acquisition means is made to acquire the brightness information of the subject, in the state where the light for shooting is turned ON by the ON/OFF control means; and control means for performing control so as to make the acquisition means acquire the brightness information of the subject by attenuating an amount of light emission of the light for shooting at the timing detected by the detection means.

In accordance with another aspect of the present invention, there is provided a method of controlling a light for shooting, comprising: an imaging step for imaging a subject; an acquisition step for acquiring brightness information of the subject; an ON/OFF control step for controlling ON/OFF of the light for shooting based on the brightness information acquired by the acquisition step; a detection step for detecting a timing at which the acquisition step is made to acquire the brightness information of the subject, in the state where the light for shooting is turned ON by the ON/OFF control step; and a control step for performing control so as to make the acquisition step acquire the brightness information of the subject by attenuating an amount of light emission of the light for shooting at the timing detected by the detection step.

In accordance with another aspect of the present invention, there is provided a computer program product for a processing program stored on a computer readable medium, comprising an imaging step for imaging a subject; an acquisition step for acquiring brightness information of the subject; an ON/OFF control step for controlling ON/OFF of the light for shooting based on the brightness information acquired by the acquisition step; a detection step for detecting a timing at which the acquisition step is made to acquire the brightness information of the subject, in the state where the light for shooting is turned ON by the ON/OFF control step; and a control step for performing control so as to make the acquisition step acquire the brightness information of the subject by attenuating an amount of light emission of the light for shooting at the timing detected by the detection step.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings as an example of application of the imaging device of the present invention in a digital camera.

A. First Embodiment

A-1. Configuration of the Digital Camera

Figure 1:
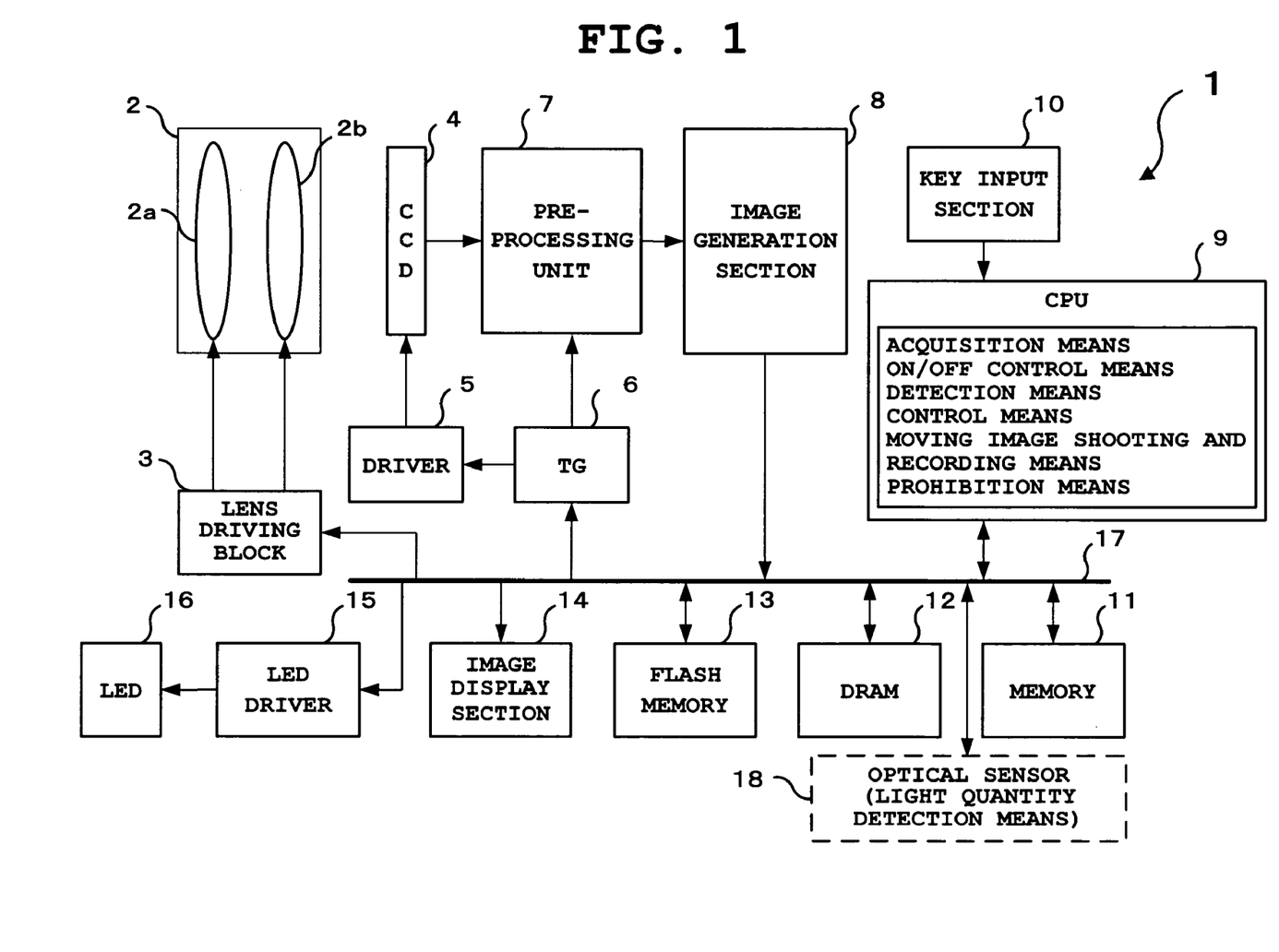
FIG. 1 is a block diagram of a digital camera according to an embodiment of the present invention.

FIG. 1 is a block diagram of an electrical schematic of a digital camera 1 that actualizes an imaging device of the present invention.

The digital camera 1 includes an imaging lens 2, a lens driving block 3, a charge-coupled device (CCD) 4, a driver 5, a timing generator (TG) 6, a pre-processing unit 7, an image generation section 8, a central processing unit (CPU) 9, a key input section 10, a memory 11, a dynamic random access memory (DRAM) 12, a flash memory 13, an image display section 14, a light-emitting diode (LED) driver 15, a LED 16 and a bus 17.

The imaging lens 2 includes a focus lens 2a consisting of a plurality of lens groups, a zoom lens 2b and the like, and the imaging lens 2 is connected to the lens driving block 3. The lens driving block 3 includes a focus motor, a zoom motor, a focus motor driver, and a zoom motor driver (not shown). The focus motor and the zoom motor respectively drive the focus lens 2a and the zoom lens 2b in an optical axis direction. The focus motor driver and the zoom motor driver respectively drive the focus motor and the zoom motor in adherence to a control signal from the CPU 9.

The CCD 4 is driven by the driver 5 and photo-electrically converts the light intensity of the respective colors in the RGB value of a subject image at a constant cycle and outputs the light intensity to the pre-processing unit 7 as an imaging signal. The CPU 9 controls the operation timings of the driver 5 and the pre-processing unit 7, via the TG 6.

Also, an optical sensor 18 (light quantity detection means) detecting the light quantity of the subject may be also provided separately from the CCD 4.

The TG 6 is connected to the pre-processing unit 7. The pre-processing unit 7 includes a correlated double sampling (CDS) circuit, an automatic gain control (AGC) circuit, and an analog-to-digital (A/D) converter. The CDS circuit performs correlated double sampling on the imaging signal outputted from the CCD 4 and holds the sampled imaging signal. The AGC circuit performs automatic gain control on the sampled imaging signal. The A/D converter converts the automatic-gain-controlled analog imaging signal to a digital signal. The imaging signal outputted from the CCD 4 is sent to the image generation section 8 as the digital signal, via the pre-processing unit 7.

The image generation section 8 performs color process processing including gamma (γ) correction processing and white balance processing to the image data which has been sent from the pre-processing unit 7, and also generates luminosity color difference signals (YUV signals). The generated image data of the luminosity color difference signals is sent to the CPU 9. That is, the image generation section 8 performs image processing to the image data outputted by the CCD 4.

The CPU 9 is a one-chip microcomputer having functions of performing compression and expansion processing (compression and expansion in a joint photographic experts group (JPEG) format or a moving picture experts group (MPEG) format, etc.), auto focus (AF) processing and image processing. The CPU 9 also controls each section of the digital camera 1. Especially, the CPU 9 has functions of performing calculation of the EV value, ON/OFF control of the LED 16, moving image imaging processing of subjects and the like.

Also, acquisition means, ON/OFF control means, detection means, control means, moving image shooting and recording means and prohibition means are stored with the form of program in the memory 11, and are executed by the CPU 9.

The key input section 10 includes a plurality of operation keys, such as a shutter button, a power ON/OFF key, a mode selection key, a cross key, and a SET key. The key input section 10 outputs operation signals to the CPU 9 depending on the key operations performed by the user.

A necessary control program and necessary data are recorded so that the CPU 9 controls each part in the memory 11. The CPU 9 operates in accordance with the program.

The DRAM 12 is used as a buffer memory temporarily storing the image data sent to the CPU 9 after being picked up by the CCD 4. The DRAM 12 is also used as a working memory of the CPU 9.

The flash memory 13 is a recording medium used to record the compressed image data.

The image display section 14 includes a color liquid crystal display (LCD) and a driver circuit for the color LCD. In stand-by mode, the image display section 14 displays the subject picked up by the CCD 4 as a through image. When playing back a recorded image, the image display section 14 displays the recorded image that has been expanded after having been read out from the flash memory 13.

The LED driver 15 turns ON (illuminating) and OFF (putting OFF) the LED 16 which is a light emitting element which emits light in adherence to the control signal of the CPU 9. The LED 16 is attached to the digital camera 1 in a predetermined position which enables emitting light to the subject of shooting. The CPU 9 judges whether the shooting scene is dark during through image display or during moving image shooting for which auxiliary emission auto focus has been set. If the CPU 9 judges that the shooting scene is dark, it sends a control signal for turning ON the LED 16 to the LED driver 15. If the CPU 9 judges that the shooting scene is bright, it sends a control signal for turning OFF the LED 16 to the LED driver 15.

A-2. Operations of the Digital Camera

Operations performed by the digital camera 1 according to the present embodiment will be described with reference to the flowchart in FIG. 2.

When the auxiliary emission auto focus has been set by operation of the key input section 10 by the user, and through image display or moving image shooting is started, the CPU 9 starts an operation of acquiring a single frame among those sequentially picked up by the CCD 4 at a predetermined interval (for example, a 30-frame interval or a one-second interval) (Step S1). All the frames sequentially picked up here by the CCD 4 may be acquired. At this time, when the CPU 9 starts through image display or moving image shooting, the CPU 9 performs operations of making the moving image frame of the subject to be sequentially picked up at a predetermined frame rate (for example, the fixed cycle of 1/30 seconds), and making the imaged moving image frame to be displayed in the image display section 14, and to be recorded in the flash memory 13 as moving image data.

Through image display is started in the case where the mode has been set to a still image shooting mode or a moving image shooting mode by the operation of the mode selection key of the key input section 10 by the user. Moving image shooting is started in the case where instruction to start moving image shooting has been given in the moving image shooting mode.

Next, when the CPU 9 starts the operation of acquiring a single frame at every predetermined interval, it calculates an EV value (or LV value) based on the image data of the acquired frame (Step S2). The EV value refers to the amount of exposure, and a high EV value means that the shooting scene is bright.

Next, the CPU 9 judges whether the LED 16 is currently in the ON state (Step S3). The ON state refers to a state in which a subject is imaged turning ON the LED 16 at least when imaging the subject (i.e., during the exposure time). Therefore, when the LED 16 is in the ON state, a subject to which light emitted by the LED 16 is hit is imaged, and when the LED 16 is in the OFF state, a subject to which light of the LED 16 is not hit is imaged.

When judged at Step S3 that the LED 16 is not currently in the ON state, the CPU 9 judges whether the calculated EV value is equal to or less than EV3 (Step S4).

When judged at Step S4 that the EV value is not equal to or less than EV3, the shooting scene is not dark, and therefore the CPU 9 returns to Step S2 as it is.

On the other hand, when judged at Step S4 that the EV Value is equal to or less than EV3, the CPU 9 judges that the shooting scene is dark, the CPU 9 sends a control signal to the LED driver 15 so as to turn the LED 16 ON (Step S5), and returns to Step S2. Accordingly, a subject to which light emitted by the LED 16 can be imaged when the shooting condition is dark.

On the other hand, when judged at Step S3 that the LED 16 is in the ON state, the CPU 9 judges whether the calculated EV value is equal to or more than EV5 (Step S6). When judged at Step S6 that the EV value is not equal to or more than 5, the CPU 9 returns to Step S2. This is because there is no problem in this case even if the LED 16 is in the ON state since the shooting scene is not too bright.

On the other hand, when judged at Step S6 that the EV value is equal to or more than 5, the CPU 9 makes a single frame to be imaged in the state where the LED 16 has been temporarily turned OFF (put OFF), and then turns ON the LED 16 again (Step S7). In other words, the CPU 9 temporarily turns OFF the LED 16 at the timing of imaging a certain single frame.

Next, the CPU 9 calculates the EV value based on the imaged frame (the frame imaged in the state where the LED 16 has been turned OFF) (Step S8).

In other words, when judged that the EV is equal to or more than EV5, the CPU 9 aims to judge whether the shooting scene is really bright or whether the shooting scene becomes bright due to light emission of the LED 16. For this purpose, the CPU 9 calculates the EV value based on a single frame imaged in the state where the LED 16 has been temporarily turned OFF. Here, the period during which the LED 16 is turned OFF is set to a period of imaging a single frame. This is because if the LED 16 was turned OFF for the period of imaging several frames the user would notice that the LED 16 has been turned OFF. This is also because in this case a dark image would be displayed even during through image display, during moving image shooting or during moving image playing back, thereby giving sense of discomfort to the user.

FIG. 3 shows time charts when imaging a single frame after temporarily turning OFF the LED 16. Note that it is assumed that the second frame in FIG. 3 is the frame imaged at Step S7.

The SUB signal in FIG. 3 is called a discharge pulse. When the discharge pulse is applied, an electric charge accumulated in the CCD 4 is discharged to the circuit board side of the CCD 4. Also, the SG signal is called a read-out signal. When the SG signal is applied, an electric charge accumulated in the CCD 4 is read out.

Figure 3A:
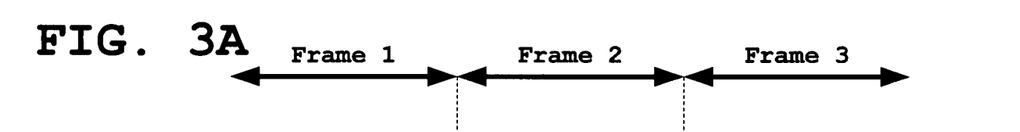
FIGS. 3A to 3E show time charts when imaging a single frame after temporarily turning OFF a LED 16.
Figure 3B:
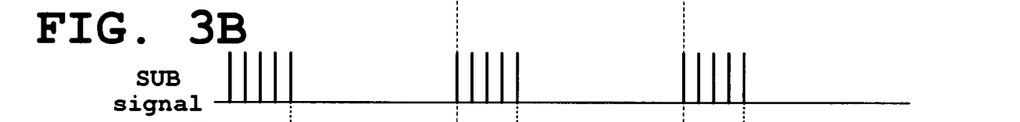
Figure 3C:
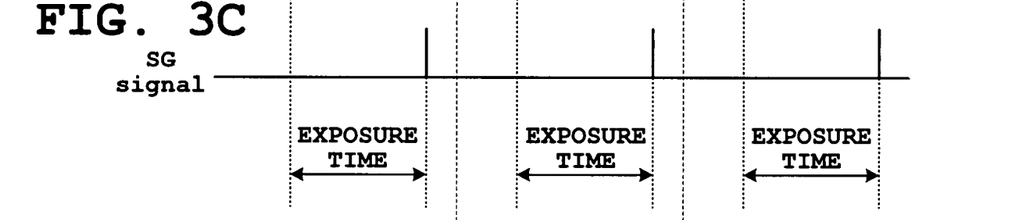

This SUB signal functions as an electronic shutter (that is, the SUB signal determines the exposure time), and the interval between the end of the SUB signal and the SG signal shall be the exposure time.

There are two methods of turning ON/OFF the LED when imaging a single frame in the state after temporarily turning OFF the LED 16 (when temporarily turning OFF the LED 16 at the timing of imaging a single frame).

Figure 3D:
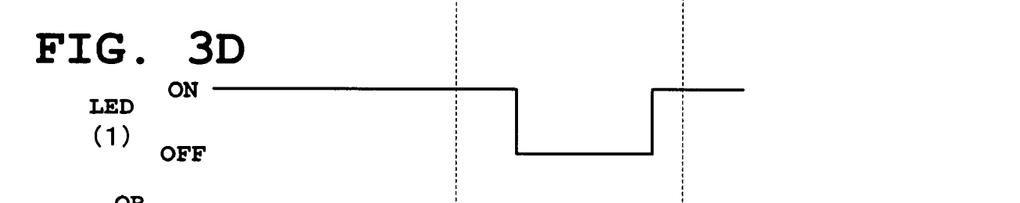

The first method is as follows. When the LED 16 is in the ON state, the LED 16 is always turned ON; and when the LED 16 is in the temporary OFF state, the LED 16 is turned OFF only during the exposure time (See LED (1) in FIG. 3).

Figure 3E:
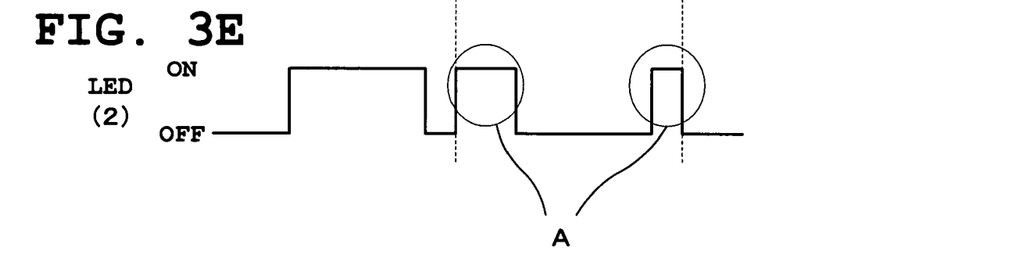

Also, a second method is as follows. When the LED 16 is in the ON state, the LED 16 is turned ON only during the exposure time of the frame; and when the LED 16 is in the temporary OFF state, the LED 16 is not turned ON even during the exposure time of the frame (See LED (2) in FIG. 3). Electrical power consumption can be reduced by turning ON the LED only during the exposure time of the frame. However, at this time, when the LED 16 is in the temporary OFF state, the LED 16 is turned ON before and after the exposure time of the frame, that is, during the period in which the SUB signal is being applied and during the period from when the exposure time ends until the signal is applied to the next frame (Periods A in FIG. 3). This is for the purpose of preventing the following situation: if the LED 16 is not turned ON during the period A, the LED 16 is turned OFF for a longer period, which may cause the user to notice that the LED 16 is not turned ON.

Next, the CPU 9 judges whether the calculated EV value is equal to or less than EV3 (Step S9).

When judged at Step S9 that the EV value is equal to or less than EV3, the shooting scene is dark, and therefore the CPU 9 returns to Step S2 as it is. At this time, the LED 16 is in the ON state.

On the other hand, when judged at Step S9 that the EV value is equal to or more than EV3, the shooting scene is not dark, and therefore the CPU 9 turns OFF the LED 16 (Step S10) and returns to Step S2.

A-3. Effects

As described above, according to the first embodiment, when the LED 16 is in the ON state and if the calculated EV value is equal to or more than EV5, it is aimed to judge whether the shooting scene is really bright. For this purpose, after imaging a single frame after temporarily turning OFF the LED 16, the CPU 9 turns ON the LED 16. Next, the CPU 9 calculates the EV value based on the frame imaged in the temporary OFF state, and judges whether to keep the LED 16 ON or turn it OFF based on the calculated EV value. Therefore, the LED 16 can be turned ON when the shooting scene is really dark independent of the reflected light of the LED 16, and the LED 16 can be turned OFF when the shooting scene is really bright. In addition, it is also possible to eliminate a useless operation of turning OFF the LED 16 because the CPU 9 misconstrues the shooting scene as bright although it is dark in fact, and subsequently turning ON the LED 16 judging that the shooting scene as dark.

In addition, the LED 16 is temporarily turned OFF during the period in which a single frame is imaged. Therefore, the CPU 9 can judge whether the shooting scene is really dark without causing the user to notice that the LED 16 has been turned OFF. In addition, the user is not given the sense of discomfort that the image becomes dark for a moment during through image display, during moving image shooting, or during moving image playback.

B. Second Embodiment

Next, the second embodiment will be described.

B-1. Configuration

According to the first embodiment, when the LED 16 is in the ON state and if the EV value is equal to or more than EV5, the LED 16 judges whether the shooting scene is really dark after temporarily turning OFF the LED 16. However, according to the second embodiment, the CPU 9 judges whether the shooting scene is really dark cyclically.

B-2. Operations of the Digital Camera

Also in the second embodiment, the imaging device of the present invention is actualized by using a digital camera 1 with a similar configuration as that shown in FIG. 1.

Operations performed by the digital camera 1 according to the second embodiment of the present embodiment will be described with reference to the flowchart in FIG. 4.

When the auxiliary emission auto focus has been set by operation of the key input section 10 by the user, and through image display or moving image shooting is started, the CPU 9 judges whether the LED 16 is currently in the ON state (Step S1). At this time, when the CPU 9 starts through image display or moving image shooting, the CPU 9 makes the CCD 4 perform processing of sequentially imaging the moving image frames of a subject at a predetermined frame rate (for example, the fixed cycle of 1/30 seconds) sequentially.

When judged at Step S31 that the LED 16 is not in the ON state, the CPU 9 acquires a single frame which has been imaged last time (Step S32), and calculates the EV value (or LV value) based on the acquired frame (Step S33).

Next, the CPU 9 judges whether the calculated EV value is equal to or less than EV3 (Step S34).

When judged at Step S34 that the calculated EV value is not equal to or less than EV3, the CPU 9 proceeds to Step S40 as it is. When judged that the calculated EV value is equal to or less then EV3, the CPU 9 turns the LED 16 ON (Step S35) and proceeds to Step S40.

On the other hand, when judged that the LED 16 is in the ON state, the CPU 9 makes a single frame to be made in the state where the LED 16 is turned OFF (Step S36), and then turns the LED 16 ON again (Step S36). In other words, the CPU 9 temporarily turns OFF the LED 16 at the timing when imaging the last single frame.

Next, the CPU 9 calculates the EV value based on the imaged frame (that is, the frame imaged in the state where the LED 16 has been turned OFF) (Step S37).

Next, the CPU 9 judges whether the calculated EV value is equal to or less than EV3 (Step S38).

When judged at Step S38 that the calculated EV value is equal to or less than EV3, the CPU 9 proceeds to Step S40 as it is. When judged that the calculated EV value is not equal to or less then EV3, the CPU 9 turns OFF the LED 16 (Step S39) and proceeds to Step S40.

When the CPU 9 proceeds to Step S40, it judges whether a predetermined period of time (for example, 1 second) has passed after the EV value is calculated.

When judged that the predetermined period of time has not passed, the CPU 9 remains at Step S40 until the predetermined period of time has passed. When judged that the predetermined period of time has passed, the CPU 9 returns to Step S31.

B-3. Effects

As described above, according to the second embodiment, when the LED 16 is in the ON state, after imaging a single frame after temporarily turning OFF the LED 16, the CPU 9 turns ON the LED 16. Next, the CPU 9 calculates the EV value based on the frame imaged in the temporary OFF state, and judges whether to keep the LED 16 ON or turn it OFF based on the calculated EV value. When the LED 16 is in the OFF state, the CPU 9 cyclically performs the operation of calculating the EV value based on a single frame imaged and judging whether to keep the LED 16 in the OFF state or turn it ON based on the calculated EV value. Therefore, it is possible to judge whether the shooting scene is really dark independent of whether the LED 16 is in the ON state or OFF state. The LED 16 can be turned ON if the shooting scene is really dark independent of the reflected light of the LED 16, and the LED 16 can be turned OFF if the shooting scene is really bright. In addition, it is also possible to eliminate a useless operation of turning OFF the LED 16 because the CPU 9 misconstrues the shooting scene as bright although it is dark in fact, and subsequently turning ON the LED 16 judging that the shooting scene as dark.

C. Third Embodiment

Next, the third embodiment will be described.

C-1. Configuration

According to the third embodiment, in the case where the LED 16 is temporarily turned OFF when the LED 16 is in the ON state during moving image shooting, a frame imaged after temporarily turning OFF the LED 16 is not recorded but is discarded in principle.

C-2. Operations of the Digital Camera

Also in the third embodiment, the imaging device of the present invention is actualized by using a digital camera 1 with a similar configuration as one shown in FIG. 1.

Figure 5:
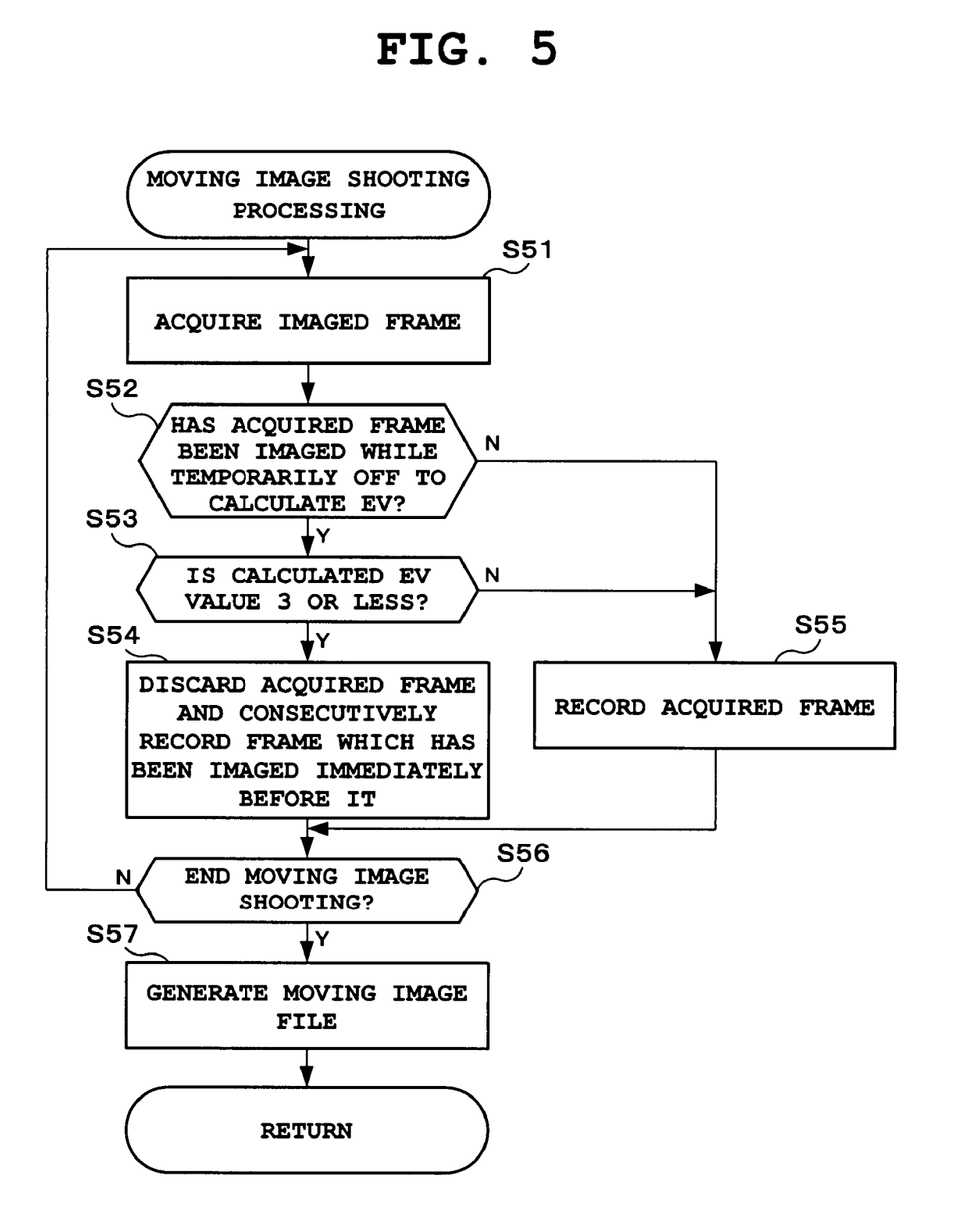
FIG. 5 is a flowchart of an operation performed by the digital camera 1 in the third embodiment.

Operations performed by the digital camera 1 according to the third embodiment of the present embodiment will be described with reference to the flowchart in FIG. 5.

When instruction to start moving image shooting has been given by operation of the key input section 10 by the user, the CPU 9 acquires a frame which is picked up by the CCD 4 at a predetermined frame rate (Step S51).

Next, the CPU 9 judges whether the acquired frame has been imaged in the temporary OFF state for the purpose of calculating the EV value (Step S52). In other words, the CPU 9 judges whether the acquired frame has been imaged at Step S7 in FIG. 2 or Step S36 in FIG. 4.

When judged at Step S52 that the acquired frame has been imaged in the temporary OFF state for the purpose of calculating the EV value, the CPU 9 judges whether the EV value calculated based on the frame is equal to or less than EV3 (Step S53). In other words, the CPU 9 judges whether the EV value calculated at Step S8 in FIG. 2 or Step S37 in FIG. 4 is equal to or less than EV3.

When judged at Step S53 that the EV value calculated based on the acquired frame is equal to or less than EV3, the CPU 9 copies, in place of the acquired frame, the frame which has been imaged immediately before the acquire frame, compresses the copied frame, records it in the flash memory 13 (Step S54), and proceeds to Step S56. In other words, the CPU 9 discards the acquired frame and consecutively records the frame which has been imaged immediately before the acquired frame.

If the EV value of the acquired frame (that is, the frame which has been imaged when the LED 16 has been temporarily turned OFF) is equal to or less than EV3, the frames before and after the acquired frame are imaged in the state where the LED 16 is ON. Accordingly, while the frames before and after the acquired frame are relatively bright images, the acquired frame is a dark image. If the acquired frame was recorded in such a case, when the recorded moving image data was played back slowly, a dark image would be displayed for a moment, thereby giving a sense of discomfort to the user. Therefore, such frames are not recorded but are discarded.

On the other hand, when judged that the frame acquired at Step 52 has not been imaged in the temporary OFF state for the purpose of calculating the EV value, or when judged that the EV value calculated based on the frame acquired at Step S53 is not equal to or less than EV3, the CPU 9 compresses the acquired frame and records it in the flash memory 13 (Step S55), and proceeds to Step S56.

This is because the phenomena that only the image of the acquired frame is dark does not occur, when judged that the frame acquired at Step 52 has not been imaged in the temporary OFF state for the purpose of calculating the EV value, or when judged that the EV Value calculated based on the frame acquired at Step S53 is not equal to or less than EV3.

When proceeding to Step S56, the CPU 9 judges whether instruction to end moving image shooting has been given by the user. The judgment is made based on whether an operation signal corresponding to the instruction to end moving image shooting has been sent from the key input section 10.

When judged at Step S56 that instruction to end moving image shooting has not been given, the CPU 9 returns to Step S51. When judged that instruction to end moving image shooting has been given, the CPU 9 generates a moving image file based on the recorded frame (Step S57).

C-3. Effects

As described above, according to the third embodiment, in the state where the LED 16 is in the ON state during moving image shooting, the frame which has been imaged after the LED 16 has been turned OFF is not recorded but is discarded. Therefore, the user is not given the sense of discomfort caused by displaying a dark image for a moment even while playing back the recorded moving image data slowly.

In addition, even if a frame has been imaged after the LED 16 has been turned OFF, the frame is not discarded but is recorded if the EV value is equal to or more than EV3 (in the case of a bright image). Accordingly, frames are not uselessly discarded and the imaged frames can be effectively utilized.

D. Variation Example

Although a LED is used as luminous body in the description of the embodiments described above, other light emitting elements may be used. The point is any substance that emits light may be used.

According to the embodiments as described above, the EV value is calculated based on the image data acquired from the image pickup device such as the CCD 4. However, a photometry sensor for measuring light intensity (light quantity) may be provided separately from the image pickup device to calculate the EV value (light quantity) based on the output from the photometry sensor. At this time, the photometry sensor is provided on the same surface as one on which the image pickup device is provided in the digital camera 1. In other words, the photometry sensor is provided on the surface to which the reflected light of light emitted from the LED 16 is incident. In this case, the period of temporarily turning OFF the luminous body does not need to match the period during which a single frame is imaged, and therefore is set to a period which is suitable for the photometry sensor to acquire the light quantity.

Figure 2:
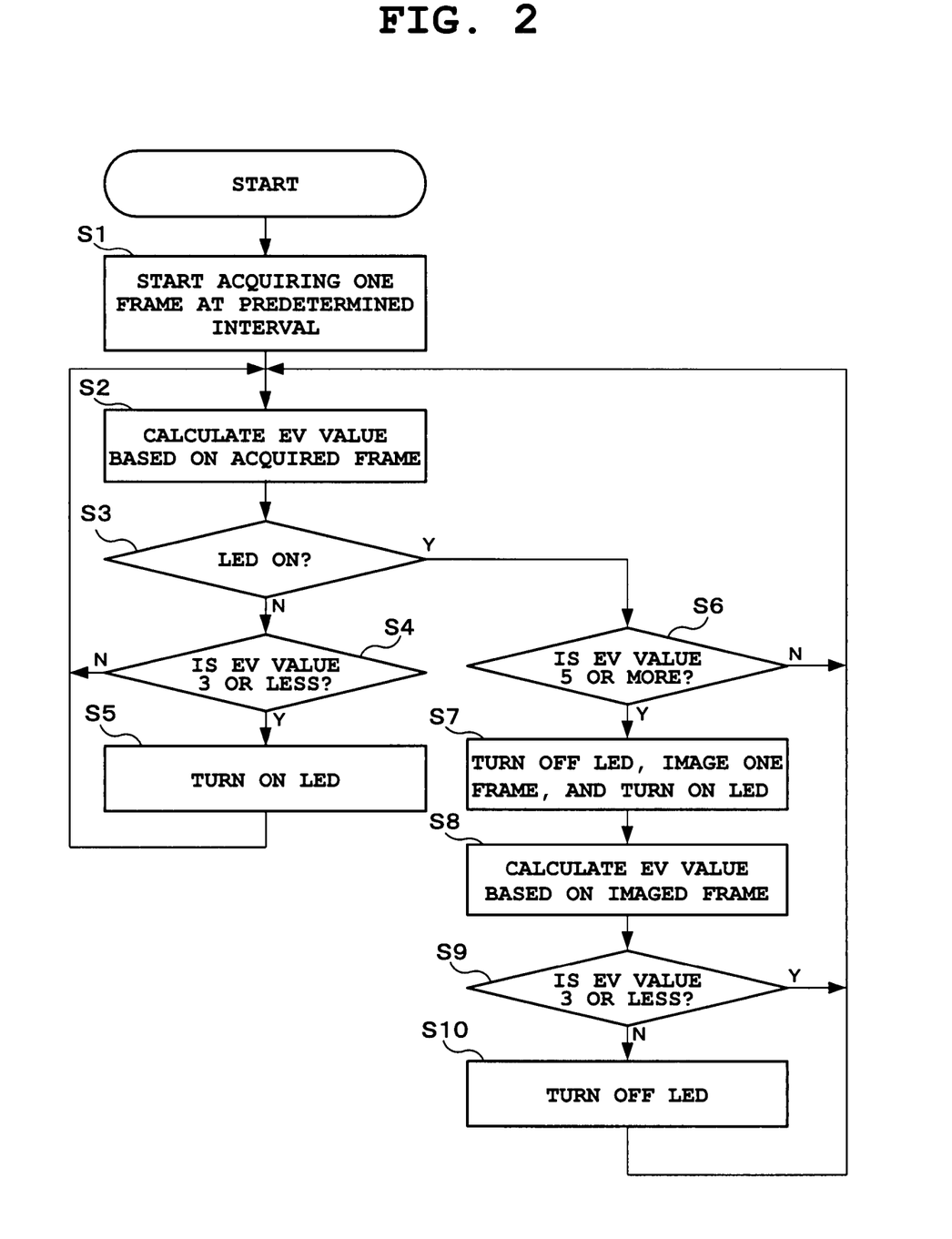
FIG. 2 is a flowchart of an operation performed by a digital camera 1 in the first embodiment.
Figure 4:
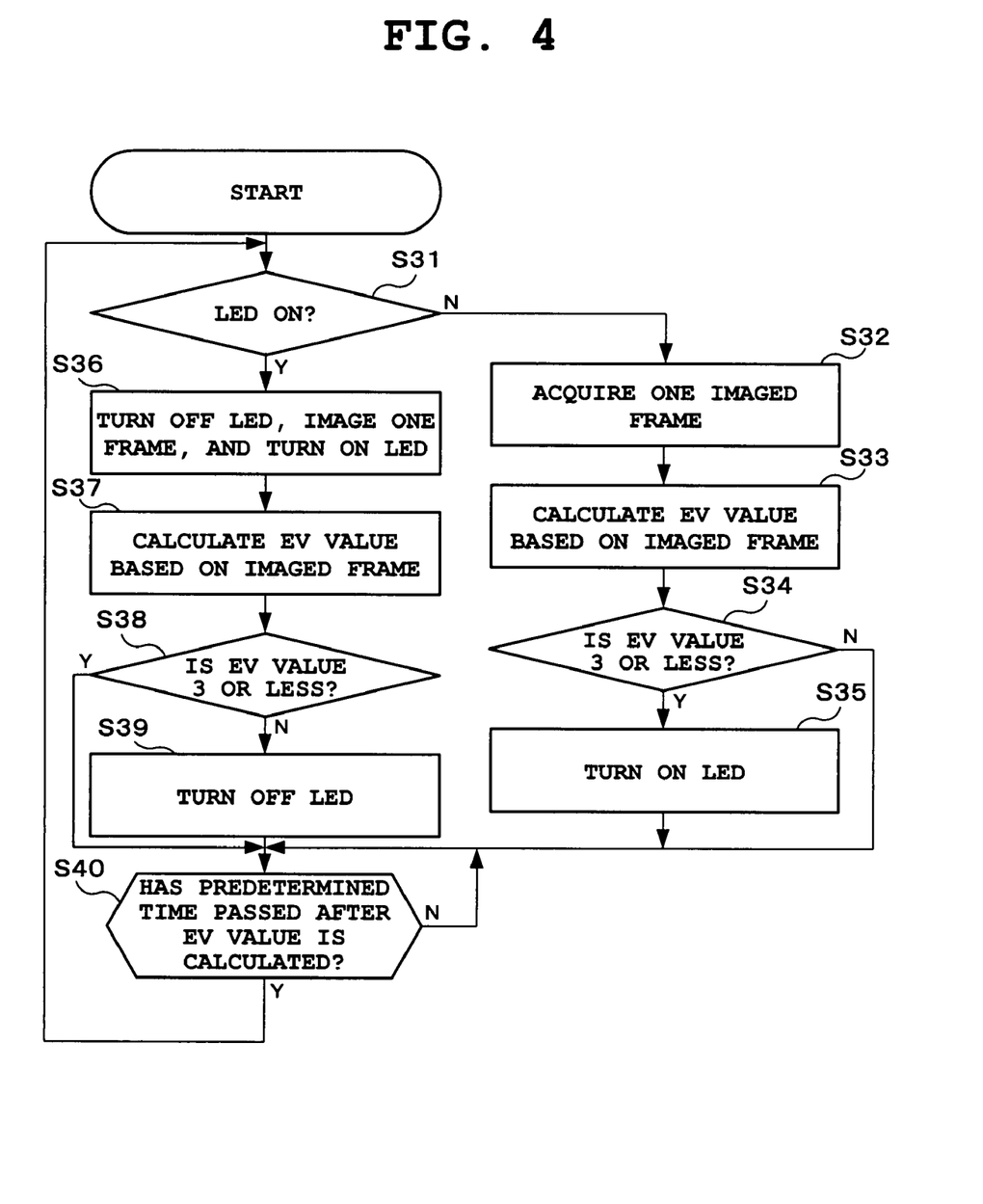
FIG. 4 is a flowchart of an operation performed by the digital camera 1 in the second embodiment.

In addition, according to the first and second embodiments described above, the LED 16 is temporarily turned OFF for the period during which a single frame is imaged to judge whether the shooting scene is really bright (at Step S7 in FIG. 2 and Step S36 in FIG. 4). However, the period of temporarily turning OFF is not limited to the period during which a single frame is imaged, and may be the period during which several frames are imaged.

Furthermore, according to the first and second embodiments described above, the LED is turned ON after a frame is imaged after the LED 16 has been temporarily turned OFF to judge whether the shooting scene is really bright (at Step S7 in FIG. 2 and Step S36 in FIG. 4). Instead, the LED 16 may be kept in the OFF state. When judged respectively at Step S9 in FIG. 2 and at Step S38 in FIG. 4 that the calculated EV value is equal to or less than EV3, the LED 16 is turned ON, and the CPU 9 moves to Step S2 in FIG. 2 and Step S40 in FIG. S40, respectively. When judged that the calculated EV value is not equal to or less than EV3, the CPU 9 may proceed to Step S2 in FIG. 2 and Step S40 in FIG. 4 respectively while keeping the LED 16 in the OFF state.

Still further, according to the first embodiment, the judgments at Step S9 in FIG. 2 are made based on whether the calculated EV value is equal to or less than EV3. However, the judgment may also be made based on whether the EV value is equal to or less than EV4. In addition, according to the first and second embodiments, judgments at Step S4 and Step S9 in FIG. 2, and Step S34 and Step S38 in FIG. 4 are made whether the EV value is equal to or less than EV3. However, other values may also be used, or the Steps may have different values to be used as judgment criteria. Similarly, at Step S6 in FIG. 2, although judgment is made based on whether the EV value is equal to or less than EV5, other values may also be used.

Still further, the digital camera 1 in the above-described embodiments is not limited to the embodiments as described above. It may be a cell phone with camera, a PDA with camera, a PC with camera, an IC recorder with camera or a digital video camera, or any apparatus with a function of imaging by emitting light to a subject.

Moreover, in each of the above-mentioned embodiments, although brightness information may be acquired by the imaging device, the present invention does not have to be such a configuration. For example, brightness information may be acquired by comprising the optical sensor 18.

Besides, although the processing program of the digital camera which is a preferred embodiment of the present invention is stored in the memory (for example, ROM, etc.) of the digital camera, this processing program is stored on a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:

1. An imaging device comprising:
   imaging means for imaging a subject;
   acquisition means for acquiring brightness information of the subject;
   light for shooting for emitting light;
   ON/OFF control means for controlling ON/OFF of the light for shooting based on the brightness information acquired by the acquisition means;
   detection means for detecting a timing at which the acquisition means is made to acquire the brightness information of the subject, in the state where the light for shooting is turned ON by the ON/OFF control means; and
   control means for performing control so as to make the acquisition means acquire the brightness information of the subject by attenuating an amount of light emission of the light for shooting at the timing detected by the detection means.

2. The imaging device according to claim 1,
   wherein the control means performs control so as to make the acquisition means acquire the brightness information of the subject by turning OFF light emission of the light for shooting.

3. The imaging device according to claim 1,
wherein the acquisition means acquires the brightness information based on image data acquired by the imaging means.

4. The imaging device according to claim 1 comprising:
light quantity detection means for detecting light quantity of the subject which is provided separately from the imaging means,
wherein the acquisition means acquires the brightness information based on the light quantity of the subject detected by the light quantity detection means.

5. The imaging device according to claim 1,
wherein the detection means detects a timing at which the brightness information acquired by the acquisition means becomes equal to or more than a first threshold.

6. The imaging device according to claim 1,
wherein the detection means detects a timing which comes at a predetermined interval.

7. The imaging device according to claim 1,
wherein the control means attenuates the light quantity of the light for shooting during a required period so that the imaging means images the image data corresponding to a single frame.

8. The imaging device according to claim 1,
wherein the ON/OFF control means performs control so as to turn OFF the light for shooting if the brightness information acquired by the acquisition means in the state where the amount of light emission of the light for shooting has been attenuated by the control by the control means is equal to or more than a second threshold.

9. The imaging device according to claim 1,
wherein the ON/OFF control means performs control so as to turn ON the light for shooting if the brightness information acquired by the acquisition means becomes less than a third threshold in the state where the light for shooting has been turned OFF.

10. The imaging device according to claim 1, comprising moving image shooting and recording means for shooting a moving image of the subject using the imaging means, and recording the shot moving image data in the recording means,
wherein the moving image shooting and recording means comprises prohibition means for prohibiting recording of the frame shot by the imaging means in the state where the amount of light emission of the light for shooting has been attenuated by the control by the control means.

11. The imaging device according to claim 10,
wherein the moving image shooting and recording means cancels the prohibition of the recording by the prohibition means if the brightness information acquired by the acquisition means in the state where the amount of light emission of the light for shooting has been attenuated by the control by the control means is equal to or more than the second threshold.

12. The imaging device according to claim 1,
wherein the light for shooting is constituted by an LED.

13. The imaging device according to claim 2,
wherein the ON/OFF control means sets a period of turning OFF light emission of the light for imaging to make the acquisition means acquire the brightness information of the subject in the state where the light for shooting has been turned ON at the timing detected by the detection means, to only a period during which the brightness information is acquired.

14. The imaging device according to claim 1,
wherein the ON/OFF control means performs control so as to turn ON the light only for the period during which exposure by the imaging means is carried out and turn OFF the light for the period during which exposure is not carried out, even in the state where the light for shooting has been turned ON.

15. The imaging device according to claim 2,
wherein the ON/OFF control means performs control so as to turn OFF light emission of the light for shooting to make the acquisition means acquire the brightness information of the subject in the state where the light for shooting has been turned ON at the timing detected by the detection means, and so as to turn ON the light for shooting only when the ON/OFF control means has decided to turn ON the light for shooting after determining whether to turn ON or OFF the light for shooting based on the brightness information.

16. A method of controlling a light for shooting, comprising:
an imaging step for imaging a subject;
an acquisition step for acquiring brightness information of the subject;
an ON/OFF control step for controlling ON/OFF of the light for shooting based on the brightness information acquired by the acquisition step;
a detection step for detecting a timing at which the acquisition step is made to acquire the brightness information of the subject, in the state where the light for shooting is turned ON by the ON/OFF control step; and
a control step for performing control so as to make the acquisition step acquire the brightness information of the subject by attenuating an amount of light emission of the light for shooting at the timing detected by the detection step.

17. A computer program product for a processing program stored on a computer readable medium, comprising
an imaging step for imaging a subject;
an acquisition step for acquiring brightness information of the subject;
an ON/OFF control step for controlling ON/OFF of the light for shooting based on the brightness information acquired by the acquisition step;
a detection step for detecting a timing at which the acquisition step is made to acquire the brightness information of the subject, in the state where the light for shooting is turned ON by the ON/OFF control step; and
a control step for performing control so as to make the acquisition step acquire the brightness information of the subject by attenuating an amount of light emission of the light for shooting at the timing detected by the detection step.

* * * * *